United States Patent [19]

Kauffman

[11] 3,962,191
[45] June 8, 1976

[54] LINEAR ISOCYANURATE POLYESTERS AND PROCESSES FOR PREPARING SAME

[75] Inventor: William J. Kauffman, Lititz, Pa.

[73] Assignee: Armstrong Cork Company, Lancaster, Pa.

[22] Filed: Dec. 31, 1974

[21] Appl. No.: 537,686

[52] U.S. Cl. ................................ 260/75 N
[51] Int. Cl.² ......................... C08G 63/68
[58] Field of Search .................. 260/75 N

[56] References Cited
UNITED STATES PATENTS

| 3,235,553 | 2/1966 | Sadle | 260/75 N |
|---|---|---|---|
| 3,279,940 | 10/1966 | Francis et al. | 260/75 N |
| 3,331,839 | 7/1967 | Little | 260/75 N |
| 3,370,045 | 2/1968 | Sadle | 260/75 N |
| 3,407,200 | 10/1968 | Little et al. | 260/75 N |
| 3,485,833 | 12/1969 | Sadle | 260/75 N |

Primary Examiner—Murray Tillman
Assistant Examiner—W. C. Danison, Jr.

[57] ABSTRACT

Phenylisocyanuric acid is reacted with acrylonitrile in the presence of N-benzyltrimethyl ammonium hydroxide; 40% in methanol, in an inert solvent at 75°C. to 150°C. to produce 1,3-bis(2-cyanoethyl)-5-phenylisocyanurate. The 1,3-bis(2-cyanoethyl)-5-phenylisocyanurate is then heated with a mineral acid to produce 1,3-bis(2-carboxyethyl-5-phenylisocyanurate. A novel polyester of the formula

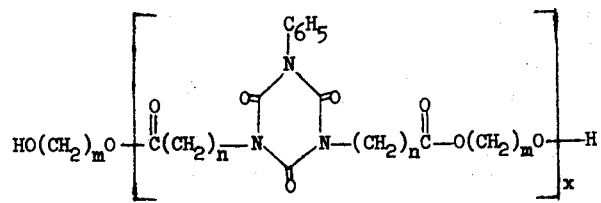

is made wherein N=2, M is a diol having at least two carbon atoms, and X is a whole number greater than 1 by condensing 1,3-bis(2-carboxyethyl)-5-phenylisocyanurate with a polyol such as 1,6-hexanediol.

3 Claims, No Drawings

LINEAR ISOCYANURATE POLYESTERS AND PROCESSES FOR PREPARING SAME

CROSS-REFERENCE TO RELATED APPLICATIONS

Copending U.S. patent application entitled Novel Isocyanurate compounds and Processes for Preparing Same by William J. Kauffman, Ser. No. 537,687, filed Dec. 31, 1974 relates to the novel isocyanurate compound 1,3-bis(2-cyanoethyl)-5-phenylisocyanurate and its hydrolysis product 1,3-bis(2-carboxyethyl)-5-phenylisocyanurate and processes for preparing same.

BACKGROUND OF THE INVENTION

1. Field of the Invention

This invention relates to novel isocyanurate organic compounds and processes. More particularly, it relates to 1,3-bis(2-carboxyethyl)-5-phenylisocyanurate and intermediates thereof. Additionally, it relates to certain processes related to the preparation of the above compounds and to novel polyesters prepared from 1,3-bis(2-carboxyethyl)-5-phenyl-isocyanurate.

2. Description of the Prior Art

Isocyanurate compositions such as those disclosed in U.S. Pat. No. 3,407,200—Little et al. are useful as intermediates in the preparation of amorphous synthetic polymers from which fibers are prepared. These fibers are particularly useful in forming coatings and molded plastic articles.

It is, therefore, an object of the present invention to provide the novel isocyanurate compound 1,3-bis(2-cyanoethyl)-5-phenylisocyanurate and its hydrolysis product 1,3-bis(2-carboxyethyl)-5-phenylisocyanurate.

It is a further object of this invention to provide a process whereby a novel compound, 1,3-bis(2-cyanoethyl)-5-phenylisocyanurate and its hydrolysis product 1,3-bis(2-carboxyethyl)-5-phenylisocyanurate will be produced.

It is a still further object of the present invention to provide the novel polyesters produced by condensing 1,3-bis(2-carboxyethyl)-5-phenylisocyanurate with a polyol such as 1,6-hexanediol.

SUMMARY OF THE INVENTION

In accordance with the present invention, it has now been discovered that 1,3-bis(2-carboxyethyl)-5-phenylisocyanurate is produced by a process which comprises reacting phenylisocyanuric acid with acrylonitrile in the presence of N-benzyltrimethyl ammonium hydroxide; 40% in methanol, in an inert solvent to yield 1,3-bis(2-cyanoethyl)-5-phenylisocyanurate as illustrated by the following reaction:

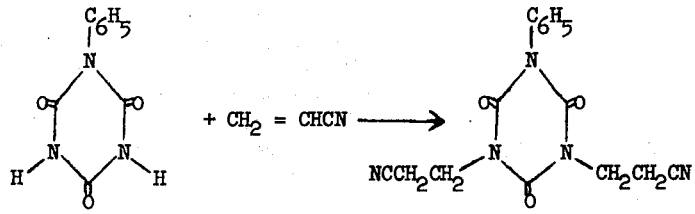

Thereafter, the resultant subject compound is hydrolyzed, by heating the intermediate compound with aqueous mineral acid, such as hydrochloric acid, or aqueous alkali to the corresponding 1,3-bis(2-carboxyethyl)-5-phenylisocyanurate.

Novel polyesters made by condensing 1,3-bis(2-carboxyethyl)-5-phenylisocyanurate with a polyol such as 1,6-hexanediol exhibit excellent strength rendering them useful in forming coatings and molded plastic articles.

DESCRIPTION OF THE PREFERRED EMBODIMENT 1,3-bis(2-carboxyethyl)-5-phenylisocyanurate is a solid dibasic carboxylic acid. It is useful in a number of applications, particularly in the preparation of its polymers such as polyesters. It is especially useful in forming coatings and molded plastic articles.

1,3-bis(2-carboxyethyl)-5-phenylisocyanurate can be prepared by the cyanoethylation reaction of phenylisocyanuric acid with acrylonitrile in the presence of N-benzyltrimethyl ammonium hydroxide (40% in methanol), in an inert reaction medium to form the intermediate 1,3-bis(2-cyanoethyl)-5-phenylisocyanurate. The intermediate is then hydrolyzed as by exposure to a strong mineral acid, such as concentrated hydrochloric acid to form the diacid.

While at least two moles of acrylonitrile to one mole of phenylisocyanuric acid is required, an excess of acrylonitrile is preferred.

Any reaction medium which is inert and which will form a suitable reaction mixture at elevated temperatures can be used. For use in the above reaction, the lower dialkyl substituted amides of lower carboxylic acids, such as dimethylformamide, diethylformamide, and dimethylacetamide, are suitable solvents. It is preferred to employ dimethylformamide as the inert reaction medium.

Any tetraalkyl ammonium hydroxide compound may be added to the reaction mixture in order to facilitate the reaction. N-benzyltrimethyl ammonium hydroxide; 40% in methanol, is the preferred tetraalkyl ammonium hydroxide compound.

The amount of tetraalkyl ammonium hydroxide present in the reaction mixture will range from about 1% to 20% by weight based on the weight of the phenylisocyanuric acid present, and preferably from about 1% to 5%.

The reaction is carried on at an elevated reaction temperature for a time sufficient to bring satisfactory yields. The acrylonitrile is added at a reasonable rate to an inert reaction medium containing phenylisocyanuric acid and N-benzyltrimethyl ammonium hydroxide; 40% in methanol, maintained at a temperature of 75°C. to 150°C., about 70°C. usually being suitable. The reaction will be carried on for a time sufficient to ensure an adequate yield, about two to ten hours being ordinarily ample, depending upon the concentration of the reactants employed, the reaction temperature, and the like.

The 1,3-bis(2-cyanoethyl)-5-phenylisocyanurate is isolated from the reaction mixture by evaporation of the inert reaction medium under reduced pressure. The intermediate compound may be further purified by recrystallization from any suitable solvent such as dimethylformamide, acetonitrile, ethanol or carbon tetrachloride.

As mentioned above, the intermediate is convertible to the desired 1,3-bis(2-carboxyethyl)-5-phenylisocyanurate by acid hydrolysis with, for example, a concentrated mineral acid such as concentrated hydrochloric acid. The hydrolysis can be conveniently effected by heating the hydrolysis mixture of the intermediate at an elevated temperature for a sufficient period of time to convert to the desired 1,3-bis(2-carboxyethyl)-5-phenylisocyanurate. An hydrolysis time of about one to ten hours at reflux temperature is usually sufficient to bring about the desired hydrolysis with hydrochloric acid. 1,3-bis(2-carboxyethyl)-5-phenylisocyanurate is recovered and isolated from the hydrolysates by following conventional procedures. Customarily, the diacid is relatively insoluble in most of the mineral acids employed for the hydrolysis, for example, in concentrated hydrochloric acid, and can be recovered from the cooled hydrolysate conveniently by following simple filtration procedures. The 1,3-bis(2-carboxyethyl)-5-phenylisocyanurate compound can be recrystallized as desired, as from distilled water.

Usable polyesters can be formed by condensing as by heating at elevated temperatures 1,3-bis(2-carboxyethyl)-5-phenylisocyanurate with the required amounts of a diol having at least two carbon atoms, and preferably two to ten carbon atoms. Suitable diols may include, for example, 1,4-butanediol, 1,6-hexanediol, ethylene glycol, diethylene glycol, alpha-propylene glycol, and decamethylene glycol. The relative quantities of the 1,3-bis(2-carboxyethyl)-5-phenylisocyanurate and diol can be varied somewhat to alter average polymer chain links, degree of esterification of the carboxyl groups, and the like. To form a largely linear polymer, at least about one mole of diol is applied for each mole of 1,3-bis(2-carboxyethyl)-5-phenylisocyanurate.

Polyesters made by condensing 1,3-bis(carboxyethyl)-5-phenylisocyanurate with a polyol as described above exhibit excellent strength rendering them extremely useful in the preparation of coatings and molded plastic articles.

Moreover, 1,3-bis(2-carboxyethyl)-5-phenylisocyanurate and the fibers derived therefrom are extremely thermally stable, and produce low smoke upon combustion.

The following illustrative examples more fully describe the preparation of the 1,3-bis(2-carboxyethyl)-5-phenylisocyanurate.

EXAMPLE 1

Preparation of
1,3-bis(2-cyanoethyl)-5-phenylisocyanurate

A quantity of 25 ml. of acrylonitrile (20.0 g., 0.38 mole) is added to a solution of phenylisocyanurate (20.3 g., 0.1 mole) and 5 ml. of Triton B (40% solution of benzyltrimethyl ammonium hydroxide in methanol) in 75 ml. of dimethylformamide. The reaction mixture is heated and held for two hours. It is then cooled to room temperature, and 5 ml. of 6N hydrochloric acid is added. The mixture is concentrated on a rotary evaporator at reduced pressure yielding a viscous liquid. The viscous product is slurried with pentane and solidified upon cooling. The solid is then recrystallized from ethanol yielding 64% 1,3-bis(2-cyanoethyl)-5-phenylisocyanurate (19.8 g., 0.064 ml.).

Preparation of
1,3-bis(2-carboxyethyl)-5-phenylisocyanurate

A mixture of 1,3-bis(2-cyanoethyl)-5-phenylisocyanurate (200 g., 0.64 ml.), concentrated hydrochloric acid (950 ml.), and water (150 ml.) is refluxed for 4 hours, and then cooled to 0°C. The resulting precipitate is collected and recrystallized from water to yield (78%) 1,3-bis(2-carboxyethyl)-5-phenylisocyanurate (175 g., 0.50 ml.).

Preparation of the Polyester

A mixture of 20 g. of 1,3-bis(2-carboxyethyl)-5-phenylisocyanurate, 50 g. 1,4-butanediol, and 0.2 g. dibutyltin dilaurate is heated at 200°C. for 8 hours to complete the direct esterification. The excess diol is distilled off as the vacuum is lowered to 1.0 mm. over thirty minutes. The polycondensation is conducted at this temperature for twenty-four hours. A nearly quantitative yield of polymer is obtained after cooling to room temperature.

EXAMPLE 2

Preparation of
1,3-bis(2-cyanoethyl)-5-phenylisocyanurate

In accordance with the procedure of Example 1, 3 ml. of Triton B (benzyltrimethyl ammonium hydroxide; 40% in methanol), is added to a solution of 20.3 g. (0.1 mole) of phenylisocyanurate and 75 ml. of dimethylformamide. To this solution, 25 ml. of acrylonitrile (20.0 g., 0.38 mole) is added over a period of 45 mintues and the final solution is heated at reflux (120°C.) for 3 hours. The solution is cooled to room temperature and 5 ml. of 6N hydrochloric acid is added to acidify the mixture. The dimethylformamide and the excess acrylonitrile are evaporated off at reduced pressure. The residue is recrystallized from ethanol yielding 1,3-bis(2-cyanoethyl)-5-phenylisocyanurate.

Preparation of
1,3-bis(2-carboxyethyl)-5-phenylisocyanurate

In like fashion, to Example 1, the intermediate 1,3-bis(2-cyanoethyl)-5-phenylisocyanurate is hydrolyzed by hydrochloric acid. A mixture of 200 g. of 1,3-bis(2-cyanoethyl)-5-phenylisocyanurate and 950 ml. of concentrated hydrochloric acid is refluxed for four hours. The solution is cooled to 5°C. and the solid filtered. Recrystallization from water yields 174 g. of 1,3-bis(2-carboxyethyl)-5-phenylisocyanurate.

Preparation of the Polyester

A mixture of 20 g. of 1,3-bis(2-carboxyethyl)-5-phenylisocyanurate, 20 g. of 1,6-hexanediol, 0.02 g. zinc acetate, and 0.02 g. of stannous oxalate is heated at 200°C. under nitrogen flow and the liberated ethanol collected for four hours. The pressure is lowered to 0.2 mm. and the melt temperature increased to 200°C. over 45 minutes. After 4 hours, the melt becomes too viscous to stir. The resin is brought to atmospheric pressure and removed while hot. The resultant polyester is very strong, elastic, and capable of being melt pressed into films.

What is claimed is:

1. A process for preparing a novel polyester which comprises reacting phenylisocyanuric acid with acrylonitrile in the presence of N-benzyltrimethyl ammonium hydroxide; 40% in methanol, in an inert reaction medium at a temperature of about 75°C. to 150°C. to form the intermediate 1,3-bis(2-cyanoethyl)-5-phenylisocyanurate, hydrolyzing said intermediate in the presence of an acid to yield 1,3-bis(2-carboxyethyl)-5-phenylisocyanurate, and condensing 1,3-bis(2-carboxyethyl)-5-phenylisocyanurate with a diol of two to ten carbon atoms.

2. The process in accordance with claim 1 wherein the inert reaction medium is dimethylformamide.

3. A process in accordance with claim 1 wherein said diol is 1,6-hexanediol.

* * * * *